(12) United States Patent
Watari (10) Patent No.: US 11,783,979 B2
(45) Date of Patent: Oct. 10, 2023

(54) SOLENOID

(71) Applicant: DENSO CORPORATION, Kariya (JP)

(72) Inventor: Yutaro Watari, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/218,383

(22) Filed: Mar. 31, 2021

(65) Prior Publication Data

US 2021/0217547 A1 Jul. 15, 2021

Related U.S. Application Data

(63) Continuation of application No. PCT/JP2019/037249, filed on Sep. 24, 2019.

(30) Foreign Application Priority Data

Oct. 2, 2018 (JP) ................................ 2018-187067

(51) Int. Cl.
*H01F 3/00* (2006.01)
*H01F 7/08* (2006.01)
*H01F 7/16* (2006.01)
*F16K 31/06* (2006.01)

(52) U.S. Cl.
CPC .............. *H01F 7/081* (2013.01); *H01F 7/16* (2013.01); *F16K 31/0613* (2013.01); *F16K 31/0675* (2013.01); *H01F 2007/086* (2013.01)

(58) Field of Classification Search
CPC ...... H01F 7/081; H01F 7/16; H01F 2007/086; H01F 2007/083; H01F 2007/085; H01F 7/1607; F16K 31/0613; F16K 31/0675; F16K 31/00

USPC ......................................................... 335/279
See application file for complete search history.

(56) References Cited

U.S. PATENT DOCUMENTS

| | | | | |
|---|---|---|---|---|
| 4,604,597 A * | 8/1986 | Bogner | ................... | H01H 3/001 335/131 |
| 5,986,528 A * | 11/1999 | Meier | ....................... | H01H 1/54 335/184 |
| 6,409,144 B1 * | 6/2002 | Inami | ....................... | H01F 7/081 335/255 |
| 7,116,196 B1 * | 10/2006 | Hirabayashi | ......... | H01H 50/443 335/282 |
| 7,199,687 B2 * | 4/2007 | Maruhashi | ........... | H01H 50/163 335/265 |

(Continued)

*Primary Examiner* — Shawki S Ismail
*Assistant Examiner* — Lisa N Homza
(74) *Attorney, Agent, or Firm* — Nixon & Vanderhye P.C.

(57) ABSTRACT

A solenoid includes a coil, a cylindrical sliding core, a columnar plunger, a bottomed cylindrical yoke including a cylindrical portion and a bottom portion that is connected to the cylindrical portion and faces a base end surface of the plunger, and the bottomed cylindrical yoke configured to accommodate the coil, the sliding core, and the plunger, a magnetic attraction core arranged to face a distal end surface of the plunger, and a magnetic flux transfer member that transfers magnetic flux between the sliding core and the yoke. When the plunger is closest to the magnetic attraction core, a position of the base end surface of the plunger along an axial direction is the same as position of the end of the sliding core along the axial direction, or is closer to the bottom portion side of the sliding core along the axial direction than the end of the sliding core.

9 Claims, 3 Drawing Sheets

(56) References Cited

U.S. PATENT DOCUMENTS

| | | | | |
|---|---|---|---|---|
| 7,280,021 | B2* | 10/2007 | Nagasaki | H01F 7/1607 |
| | | | | 335/227 |
| 7,978,035 | B2* | 7/2011 | Usami | H01H 51/065 |
| | | | | 335/297 |
| 8,237,524 | B2* | 8/2012 | Niimi | F02N 15/067 |
| | | | | 335/131 |
| 8,289,110 | B2* | 10/2012 | Niimi | F02N 11/087 |
| | | | | 335/126 |
| 8,446,239 | B2* | 5/2013 | Niimi | H01H 51/065 |
| | | | | 335/131 |
| 2006/0243938 | A1 | 11/2006 | Ishibashi et al. | |
| 2007/0188278 | A1* | 8/2007 | Tsukada | H01H 50/36 |
| | | | | 335/132 |
| 2007/0194868 | A1* | 8/2007 | Kurasawa | H01H 51/065 |
| | | | | 335/132 |
| 2011/0115587 | A1* | 5/2011 | Ishibashi | H01F 7/081 |
| | | | | 335/255 |
| 2011/0128104 | A1* | 6/2011 | Yasoshima | H01F 7/127 |
| | | | | 335/297 |

* cited by examiner

SOLENOID

CROSS REFERENCE TO RELATED APPLICATIONS

This application is a continuation application of International patent Application No. PCT/JP2019/037249 filed on Sep. 24, 2019, which designated the U.S. and based on and claims the benefits of priority of Japanese Patent Application No. 2018-187067 filed on Oct. 2, 2018. The entire disclosure of all of the above applications is incorporated herein by reference.

TECHNICAL FIELD

The present disclosure relates to a solenoid.

BACKGROUND

A solenoid has a coil that generates a magnetic force when energized, a stator core provided inside the coil, and a plunger that slides inside the stator core.

SUMMARY

There is a demand for a technique capable of suppressing a decrease in the thrust of the solenoid when the plunger is very close to the magnetic attraction core.

The present disclosure can be realized as the following embodiments.

According to one aspect of the present disclosure, a solenoid is provided. The solenoid includes a coil configured to generate a magnetic force when energized, a cylindrical sliding core arranged on an inner peripheral surface of the coil, a columnar plunger arranged on the inner peripheral surface of the sliding core and configured to slide in an axial direction, a bottomed cylindrical yoke including a cylindrical portion along the axial direction and a bottomed portion that is connected to the cylindrical portion, is formed in a direction intersecting the axial direction and faces a base end surface of the plunger, and the bottomed cylindrical yoke configured to accommodate the coil, the sliding core, and the plunger, a magnetic attraction core arranged in the axial direction to face a distal end surface of the plunger and configured to attract magnetically the plunger by a magnetic force generated by the coil, and a magnetic flux transfer member that is arranged on an outer peripheral side of an end of the sliding core facing the bottom portion and transfers magnetic flux between the sliding core and the yoke. When the plunger is closest to the magnetic attraction core, a position of the base end surface of the plunger along the axial direction is the same as a position of the end of the sliding core along the axial direction, or is closer to the bottom portion side of the sliding core along the axial direction than the end of the sliding core.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENT

In an assumable example, a solenoid has a coil that generates a magnetic force when energized, a stator core provided inside the coil, and a plunger that slides inside the stator core. A magnetic ring core is arranged on an outer periphery of the stator core. As a result, a magnetic circuit component such as a yoke and the stator core are magnetically coupled via a ring core, and a decrease in magnetic force due to an assembly gap between the magnetic circuit component and the stator core is suppressed.

In the solenoid, when a plunger is very close to a magnetic attraction core with a relatively large current flowing through the coil, a magnetic flux transfer area at an end of the plunger opposite to a magnetic attraction core side may decrease, and a thrust of the solenoid may decrease. Therefore, there is a demand for a technique capable of suppressing a decrease in the thrust of the solenoid when the plunger is very close to the magnetic attraction core.

The present disclosure can be realized as the following embodiments.

According to one aspect of the present disclosure, a solenoid is provided. The solenoid include a coil configured to generate a magnetic force when energized, a cylindrical sliding core arranged on an inner peripheral surface of the coil, a columnar plunger arranged on the inner peripheral surface of the sliding core and configured to slide in an axial direction, a bottomed cylindrical yoke including a cylindrical portion along the axial direction and a bottomed portion that is connected to the cylindrical portion, is formed in a direction intersecting the axial direction and faces a base end surface of the plunger, and the bottomed cylindrical yoke configured to accommodate the coil, the sliding core, and the plunger, a magnetic attraction core arranged in the axial direction to face a distal end surface of the plunger and configured to attract magnetically the plunger by a magnetic force generated by the coil, and a magnetic flux transfer member that is arranged on an outer peripheral side of an end of the sliding core facing the bottom portion and transfers magnetic flux between the sliding core and the yoke. When the plunger is closest to the magnetic attraction core, a position of the base end surface of the plunger along the axial direction is the same as a position of the end of the sliding core along the axial direction, or is closer to the bottom portion side of the sliding core along the axial direction than the end of the sliding core.

According to this configuration of solenoid, when the plunger is closest to the magnetic attraction core, the axial position of the base end surface of the plunger is the same as the axial position of the end of the sliding core or the bottomed portion side along the axial direction from the end of the sliding core. Therefore, it is possible to suppress fluctuations in the overlapping amount between the sliding core and the plunger depending on the stroke amount of the plunger (movement amount along the axial direction). Therefore, when the plunger is very close to the magnetic attraction core, it is possible to suppress a decrease in the magnetic flux transfer area between the sliding core and the plunger, and it is possible to suppress a decrease in the thrust of the solenoid.

The present disclosure can be realized as the following embodiments. For example, the present disclosure can be realized in the embodiment of a solenoid valve, a method of manufacturing a solenoid, and the like.

A. First Embodiment

Figure 1:
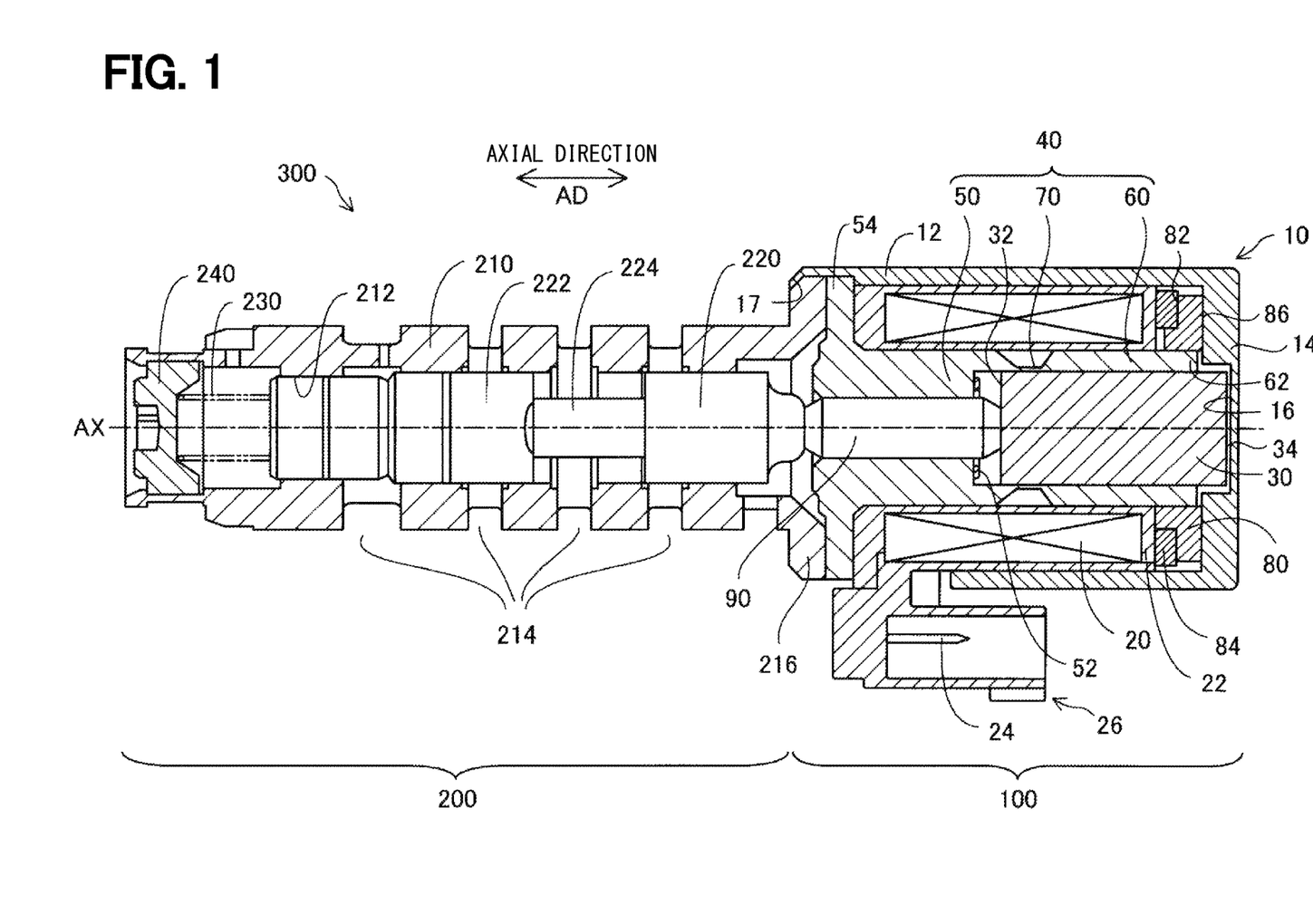
FIG. 1 is a cross-sectional view showing a schematic configuration of a linear solenoid valve to which a solenoid according to a first embodiment is applied.
Figure 2:
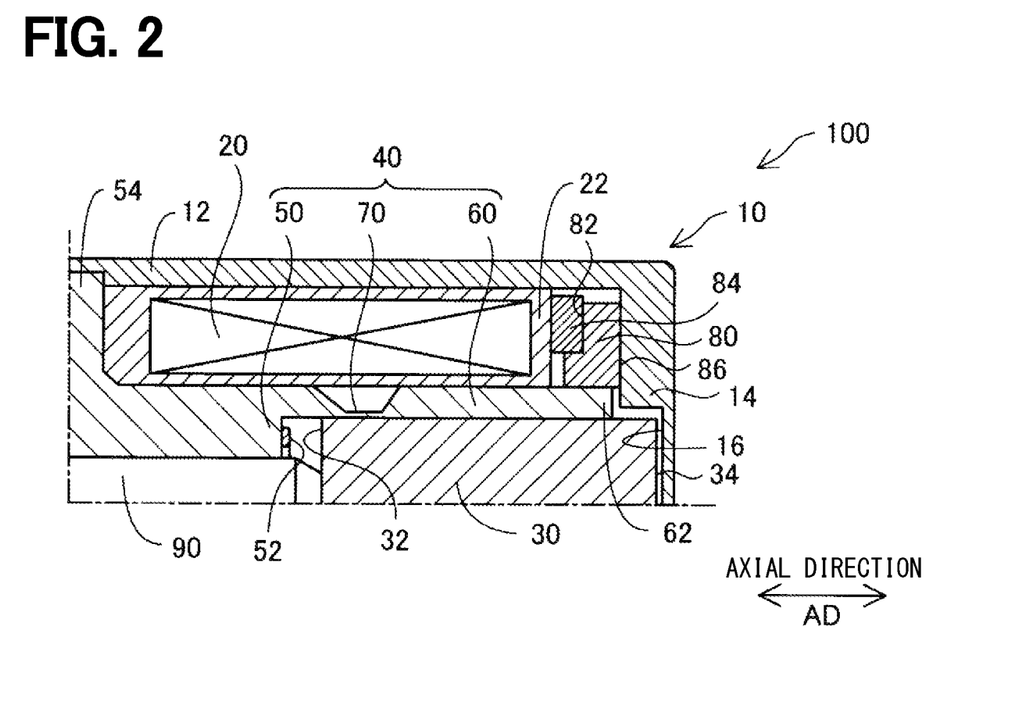
FIG. 2 is a partial cross-sectional view for explaining a configuration of a main part of the solenoid.

A solenoid 100 according to the first embodiment shown in FIG. 1 is applied to a linear solenoid valve 300 and functions as an actuator for driving a spool valve 200. The linear solenoid valve 300 is used to control a hydraulic pressure of a hydraulic oil supplied to an automatic transmission for vehicles (not shown), and is arranged in a hydraulic circuit (not shown). The linear solenoid valve 300 includes a spool valve 200 and a solenoid 100 arranged side by side along a central axis AX. FIGS. 1 and 2 show the solenoid 100 and the linear solenoid valve 300 in a non-energized state. Although the linear solenoid valve 300 of the present embodiment is a normally closed type, it may be a normally open type.

The spool valve 200 adjusts a communication state and an opening area of a plurality of oil ports 214, which will be described later. The spool valve 200 includes a sleeve 210, a spool 220, a spring 230, and an adjust screw 240.

The sleeve 210 has a substantially cylindrical external shape. The sleeve 210 is formed with an insertion hole 212 penetrating along the central axis AX and a plurality of oil ports 214 communicating with the insertion hole 212 and opening in a radial direction. The spool 220 is inserted into the insertion hole 212. The plurality of oil ports 214 are formed side by side along a direction parallel to the central axis AX. The direction is hereinafter, referred to as "axial direction AD". The plurality of oil ports 214 function, for example, as an input port that communicates with an oil pump (not shown) to receive oil supply, an output port that communicates with a clutch (not shown) to supply oil, a drain port that discharges hydraulic oil, and the like. A flange portion 216 is formed at an end of the sleeve 210 on the solenoid 100 side. The flange portion 216 has a diameter that increases radially outward, and is fixed to a yoke 10 of the solenoid 100 described later.

The spool 220 has a plurality of large-diameter portions 222 and small-diameter portion 224 arranged side by side along the axial direction AD, and has a substantially rod-like external shape. The spool 220 slides along the axial direction AD inside the insertion hole 212, and adjusts the communication state and the opening area of the plurality of oil ports 214 according to a position along the axial direction AD between the large-diameter portion 222 and the small-diameter portion 224. A shaft 90 for transmitting the thrust of the solenoid 100 to the spool 220 is disposed in contact with one end of the spool 220. The spring 230 is arranged at the other end of the spool 220. The spring 230 is configured by a compression coil spring, and presses the spool 220 in the axial direction AD to urge the spool 220 toward the solenoid 100. The adjust screw 240 is arranged in contact with the spring 230, and adjusts the spring load of the spring 230 by adjusting an amount of screwing into the sleeve 210.

The solenoid 100 shown in FIGS. 1 and 2 is energized by an electronic control unit (not shown) to drive the spool valve 200. The solenoid 100 includes a yoke 10, a coil 20, a plunger 30, a stator core 40, and a magnetic flux transfer member 80.

The yoke 10 is made of a magnetic metal, and forms an outer shell of the solenoid 100 as shown in FIG. 1. The yoke 10 has a bottomed cylindrical external shape, and accommodates the coil 20, the plunger 30, the stator core 40, and the magnetic flux transfer member 80. The yoke 10 has a cylindrical portion 12, a bottom portion 14, and an opening 17. The cylindrical portion 12 has a substantially cylindrical external shape along the axial direction AD. The bottom portion 14 is formed at the end of the cylindrical portion 12 on the side opposite to the spool valve 200 side, perpendicular to the axial direction AD. The bottom portion 14 is not limited to being perpendicular to the axial direction AD, and may be formed substantially perpendicularly, or may be formed to intersect with the axial direction AD. A recess 16 recessed in the axial direction AD is formed inside the yoke 10 at substantially the center of the bottom portion 14. The recess 16 is configured to accommodate a base end surface 34 of the plunger 30, which will be described later. The opening 17 is formed at the end of the cylindrical portion 12 on the spool valve 200 side. The opening 17 is caulked and fixed to a flange portion 216 of the spool valve 200 after the components of the solenoid 100 are assembled inside the yoke 10. In the present embodiment, the yoke 10 is formed by press molding, but may be formed by any molding method such as casting.

The coil 20 is formed by winding an insulating coated lead wire around a resin bobbin 22 arranged inside the cylindrical portion 12 of the yoke 10. The end of the lead wire forming the coil 20 is connected to a connection terminal 24. The connection terminal 24 is arranged inside the connector 26. The connector 26 is arranged on the outer peripheral portion of the yoke 10 and electrically connects the solenoid 100 and the electronic control device via a connection line (not shown). The coil 20 generates a magnetic force when energized, and a loop-shaped magnetic flow (hereinafter, also referred to as "magnetic circuit") through the cylindrical portion 12 and the bottom portion 14 of the yoke 10, the magnetic flux transfer member 80, a sliding core 60 of the stator core 40 described later, the plunger 30, and a magnetic attraction core 50 and a flange 54 of the stator core 40 described later is formed. In the states shown in FIGS. 1 and 2, the coil 20 is not energized and the magnetic circuit is not formed.

The plunger 30 has a substantially cylindrical external shape and is made of a magnetic metal. The plunger 30 slides in the axial direction AD on the inner peripheral surface of the sliding core 60 described later, which is arranged on the inner peripheral surface of the coil 20. The above-described shaft 90 is disposed in contact with an end surface of the plunger 30 on the spool valve 200 side (hereinafter, also referred to as a "distal end surface 32"). Thereby, the plunger 30 is urged toward the bottom portion 14 side of the yoke 10 along the axial direction AD by the urging force of the spring 230 transmitted to the spool 220. The end surface (hereinafter, also referred to as "base end surface 34") opposite to the distal end surface 32 faces the bottom portion 14 of the yoke 10 and is housed in the recess 16 in a state where at least the coil 20 is not energized. A breathing hole (not shown) penetrating the axial AD is formed in the plunger 30 and the shaft 90. The hydraulic oil of the hydraulic circuit flows through the breathing hole.

The stator core 40 has a substantially cylindrical external shape and is made of a magnetic metal. The stator core 40 has a magnetic attraction core 50, a sliding core 60, and a magnetic blocking portion 70.

The magnetic attraction core 50 is disposed so as to surround the shaft 90 in the circumferential direction. The magnetic attraction core 50 constitutes a portion of the stator core 40 on the spool valve 200 side, and magnetically attracts the plunger 30 by the magnetic force generated by the coil 20. A stopper 52 is disposed on a surface of the magnetic attraction core 50 facing the distal end surface 32 of the plunger 30. The stopper 52 is made of a non-magnetic material, and suppresses a direct contact between the plunger 30 and the magnetic attraction core 50, and also prevents the plunger 30 from being separated from the magnetic attraction core 50 due to the magnetic attraction. A flange 54 is formed on the end surface of the magnetic attraction core 50 on the spool valve 200 side. The flange 54 is fixed to the yoke 10 by being arranged in contact with the end surface of the flange portion 216 to be caulked and fixed in the opening 17 of the yoke 10.

The sliding core 60 constitutes a part of the stator core 40 on the bottom portion 14 side. The sliding core 60 has a substantially cylindrical external shape, and is arranged on the inner peripheral surface of the coil 20 and the outer peripheral surface of the plunger 30. In other words, the sliding core 60 is arranged between the coil 20 and the plunger 30 in the radial direction. A gap between the sliding core 60 and the plunger 30 in the radial direction is extremely small. The sliding core 60 guides a movement of the plunger 30 along the axial AD. As a result, the plunger 30 slides directly on the inner peripheral surface of the sliding core 60. The end (hereinafter, also referred to as "end 62") of the sliding core 60 opposite to the magnetic attraction core 50 side faces the bottom portion 14. The end 62 is not fixed to the yoke 10. Further, the end 62 is not housed in the recess 16 formed in the bottom portion 14 of the yoke 10. In other words, the end 62 is arranged on the magnetic attraction core 50 side along the axial direction AD with respect to the recess 16.

A magnetic blocking portion 70 is formed between the magnetic attraction core 50 and the sliding core 60 in the axial direction AD. The magnetic blocking portion 70 suppresses a direct flow of magnetic flux between the magnetic attraction core 50 and the sliding core 60. The magnetic blocking portion 70 of the present embodiment is configured such that a radial thickness of the stator core 40 is formed to be thin, so that the magnetic resistance thereof is larger than that of the magnetic attraction core 50 and the sliding core 60.

The magnetic flux transfer member 80 is arranged on the outer peripheral side of the end 62 of the sliding core 60. Therefore, the magnetic flux delivery member 80 is arranged between the bobbin 22 and the bottom portion 14 of the yoke 10 in the axial direction AD. The magnetic flux transfer member 80 is composed of a ring-shaped member made of a magnetic material. The magnetic flux transfer member 80 transfers the magnetic flux between the sliding core 60 and the yoke 10. More specifically, the magnetic flux is transferred to and from the bottom 14 of the yoke 10 and the magnetic flux is transferred to and from the sliding core 60. The magnetic flux transfer member 80 may transfer the magnetic flux to and from the cylindrical portion 12 of the yoke 10.

A radial gap is provided between the outer peripheral surface of the magnetic flux transfer member 80 and the inner peripheral surface of the cylindrical portion 12 of the yoke 10. As a result, the magnetic flux transfer member 80 is configured to be displaceable according to a radial displacement of the end 62 of the sliding core 60. A minute gap for assembly is provided between the inner peripheral surface of the magnetic flux transfer member 80 and the outer peripheral surface of the sliding core 60. Further, a length of the magnetic flux transfer member 80 along the axial direction AD is smaller than a gap along the axial direction AD between the bobbin 22 and the bottom portion 14 of the yoke 10. Further, the end surface 86 of the magnetic flux transfer member 80 facing the bottom portion 14 is located closer to the bottom portion 14 in the axial direction AD than the end 62 of the sliding core 60.

In the present embodiment, an outer edge portion 82 of the magnetic flux transfer member 80 is formed to be recessed on the side facing the bobbin 22. Therefore, the cross-sectional shape of the magnetic flux transfer member 80 in the cross section including the central axis AX is formed in a substantially L shape. An urging member 84 is arranged between the outer edge portion 82 and the bobbin 22. The urging member 84 presses the magnetic flux transfer member 80 against the bottom portion 14 of the yoke 10. As a result, the magnetic flux transfer member 80 and the bottom portion 14 come into contact with each other in both the energized state and the non-energized state. Therefore, by magnetic attraction at the start of energization, it is possible to suppress a generation of sound in which the magnetic flux transfer member 80 abuts on the bottom portion 14. The urging member 84 of the present embodiment is composed of a wave washer, but may be composed of any member capable of urging the magnetic flux transfer member 80, such as a disc spring or rubber having excellent oil resistance. The recess of the outer edge portion 82 and the urging member 84 may be omitted.

In the present embodiment, the yoke 10, the plunger 30, the stator core 40, and the magnetic flux transfer member 80 are each made of iron. Not limited to iron, it may be composed of any magnetic material such as nickel and cobalt.

Figure 3:
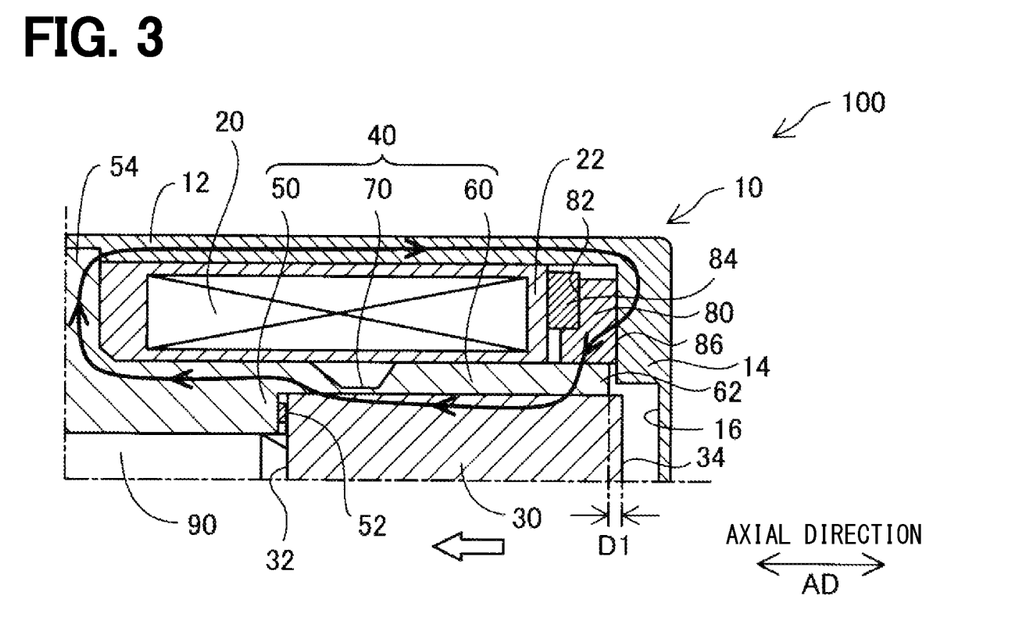
FIG. 3 is an explanatory diagram for explaining the solenoid in an energized state.

In FIG. 3, in the cross section of the main part of the solenoid 100 similar to FIG. 2, the magnetic circuit formed by energization is shown by a thick arrow. As described above, the magnetic circuit is formed to pass through the cylindrical portion 12 of the yoke 10, the bottom portion 14 of the yoke 10, the magnetic flux transfer member 80, the sliding core 60, the plunger 30, the magnetic attraction core 50, and the flange 54. Therefore, the plunger 30 is attracted to the magnetic attraction core 50 side by energizing the coil 20. As a result, the plunger 30 slides on the inner peripheral surface of the sliding core 60 along the axial direction AD in the direction of the white arrow shown in FIG. 3. In this way, the plunger 30 strokes toward the magnetic attraction core 50 side against the urging force of the spring 230 by energizing the coil 20. As the current flowing through the coil 20 increases, the magnetic flux density of the magnetic circuit increases, and the stroke amount of the plunger 30 increases. The "stroke amount of the plunger 30" means an amount of the plunger 30 moving toward the magnetic attraction core 50 side along the axial direction AD in the reciprocating movement of the plunger 30 in the reciprocating movement of the plunger 30 starting from a position where the plunger 30 is farthest from the magnetic attraction core 50 as a base point. The state in which the plunger 30 is farthest from the magnetic attraction core 50 corresponds to the non-energized state. On the other hand, the state in which the plunger 30 is closest to the magnetic attraction core 50 corresponds to a state in which a relatively large current is passed and the distal end surface 32 of the plunger 30 and the stopper 52 are in contact with each other, and the stroke amount of the plunger 30 is maximized.

When the plunger 30 moves toward the magnetic attraction core 50, the shaft 90 abutting on the distal end surface 32 of the plunger 30 presses the spool 220 toward the spring 230. As a result, the communication state and the opening area of the oil port 214 are adjusted, and the hydraulic pressure proportional to the current value flowing through the coil 20 is output.

FIG. 3 shows a state in which a relatively large current is passed through the coil 20 and the plunger is closest to the magnetic attraction core 50. In this state, the base end surface 34 of the plunger 30 is located closer to the bottom portion 14 side of the yoke 10 with respect to the end 62 of the sliding core 60. More specifically, the base end surface 34 of the plunger 30 projects toward the bottom portion 14 side from the end 62 by a length D1 in the axial direction AD. Therefore, the overlapping amount between the sliding core 60 and the plunger 30 is constant regardless of the stroke amount of the plunger 30. The "overlapping amount between the sliding core 60 and the plunger 30" means the axial length AD of the portion where the sliding core 60 and the plunger 30 face each other in the radial direction. Therefore, even if the plunger 30 comes very close to the magnetic attraction core 50, the overlapping amount between the sliding core 60 and the plunger 30 does not decrease, so that it is possible to suppress a decrease in the magnetic flux transfer area between the sliding core 60 and the plunger 30. Therefore, even when the plunger 30 is very close to the magnetic attraction core 50, a sufficient magnetic flux transfer area can be secured, and a decrease in the thrust of the solenoid 100 can be suppressed.

Further, in a state where the plunger 30 is closest to the magnetic attraction core 50, the base end surface 34 of the plunger 30 is located on the bottom portion 14 side with respect to the end surface 86 of the magnetic flux transfer member 80. Therefore, the overlapping amount between the magnetic flux transfer member 80 and the plunger 30 is constant regardless of the stroke amount of the plunger 30. Therefore, since the overlapping amount between the magnetic flux transfer member 80 and the plunger 30 does not fluctuate, even if the plunger 30 comes very close to the magnetic attraction core 50, the fluctuation of the magnetic flux density in the magnetic flux transfer member 80 can be suppressed, and the reduction of the thrust of the solenoid 100 can be suppressed.

According to the solenoid 100 of the first embodiment described above, when the plunger 30 is closest to the magnetic attraction core 50, the base end surface 34 of the plunger 30 is located closer to the bottom portion 14 side in the axial direction AD than the end 62 of the sliding core 60. Therefore, it is possible to suppress fluctuations in the overlapping amount between the sliding core 60 and the plunger 30 depending on the stroke amount of the plunger 30. Therefore, when the plunger 30 is very close to the magnetic attraction core 50, it is possible to suppress a decrease in the magnetic flux transfer area between the sliding core 60 and the plunger 30, and it is possible to suppress a decrease in the thrust of the solenoid 100.

Further, in a state where the plunger 30 is closest to the magnetic attraction core 50, the base end surface 34 of the plunger 30 is located on the bottom portion 14 side with respect to the end surface 86 of the magnetic flux transfer member 80. Therefore, it is possible to prevent the overlapping amount between the magnetic flux transfer member 80 and the plunger 30 from fluctuating depending on the stroke amount of the plunger 30. Therefore, when the plunger 30 is relatively close to the magnetic attraction core 50, the fluctuation of the magnetic flux density in the magnetic flux transfer member 80 can be suppressed, and the decrease in the thrust of the solenoid 100 can be further suppressed.

Further, since the bottom portion 14 of the yoke 10 is formed with the recess 16 recessed in the axial direction AD inside the yoke 10, the base end surface 34 of the plunger 30 is accommodated in the yoke 10 in a state where the plunger 30 is farthest from the magnetic attraction core 50. Therefore, it is possible to easily realize a configuration in which the base end surface 34 of the plunger 30 is located closer to the bottom portion 14 side than the end 62 of the sliding core 60.

Further, since the end 62 of the sliding core 60 is not accommodated in the recess 16 formed in the bottom portion 14 of the yoke 10, it is possible to prevent the end 62 from coming into contact with the recess 16 and deforming the end 62 when assembling the sliding core 60 to the yoke 10. It is possible to suppress a decrease in the slidability of the plunger 30. Further, since a assembly gap between the end 62 and the recess 16 for suppressing such deformation can be omitted, the decrease in magnetic flux density due to the assembly gap can be suppressed, and the decrease in magnetic attraction performance can be suppressed.

Further, since the ring-shaped magnetic flux transfer member 80 made of a magnetic material is arranged on the outer peripheral surface of the end 62 of the sliding core 60, the magnetic flux can be transferred between the sliding core 60 and the yoke 10, and it is possible to suppress a decrease in the magnetic flux density at the end 62 of the sliding core 60. Further, since the magnetic flux transfer member 80 is configured to be displaceable according to a radial displacement of the end 62 of the sliding core 60, it is possible to absorb the radial displacement of the end 62 due to the manufacturing dimensional variation of the stator core 40 and the axial deviation in assembly.

In a solenoid in which the end of the sliding core is located closer to the bottom portion side than the base end surface of the plunger in a state where the plunger is closest to the magnetic attraction core, which is different from the present embodiment, when the plunger is very close to the magnetic attraction core, the overlapping amount between the sliding core and the plunger is reduced on the base end surface side of the plunger, and the magnetic flux transfer area is reduced. Therefore, the thrust of the solenoid may decrease.

On the other hand, according to the solenoid 100 of the present embodiment, when the plunger 30 is closest to the magnetic attraction core 50, the base end surface 34 of the plunger 30 is located closer to the bottom portion 14 side than the end 62 of the sliding core 60. Therefore, even when the plunger 30 is very close to the magnetic attraction core 50, it is possible to suppress a decrease in the magnetic flux transfer area between the sliding core 60 and the plunger 30, and it is possible to suppress the decrease in the thrust of the solenoid 100.

B. Second Embodiment

Figure 4:
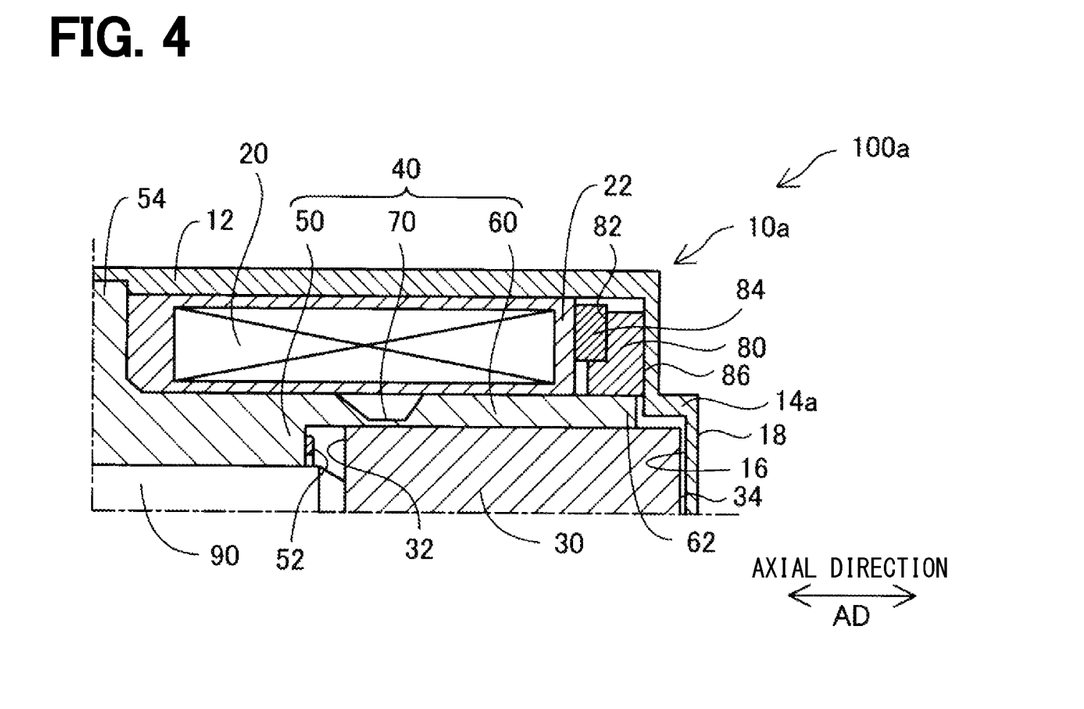
FIG. 4 is a partial cross-sectional view for explaining a configuration of the main part of the solenoid according to a second embodiment.

As shown in FIG. 4, a solenoid 100a of the second embodiment is different from the solenoid 100 of the first embodiment in that the yoke 10a is provided in place of the yoke 10. Since the other configurations are the same as those of the solenoid 100 of the first embodiment, the same configurations are designated by the same reference numerals, and detailed description thereof will be omitted.

The yoke 10a included in the solenoid 100a of the second embodiment has a convex portion 18 that protrudes outward at a position corresponding to the recess 16 on a surface of the bottom portion 14a opposite to the surface on which the recess 16 is formed. As a result, the bottom portion 14a has a substantially constant wall thickness.

According to the solenoid 100a of the second embodiment described above, the same effects as that of the first embodiment are obtained. In addition, since a convex portion 18 that protrudes outward at a position corresponding to the recess 16 on the surface of the bottom portion 14a opposite to the surface on which the recess 16 is formed, is formed, the bottom portion 14a can be formed with a constant wall thickness. Therefore, it is possible to prevent the thickness of the bottom portion 14a from becoming uneven and the strength of the bottom portion 14a from being partially reduced. Further, the yoke 10a can be easily formed by press molding using a plate-shaped molding member.

C. Third Embodiment

Figure 5:
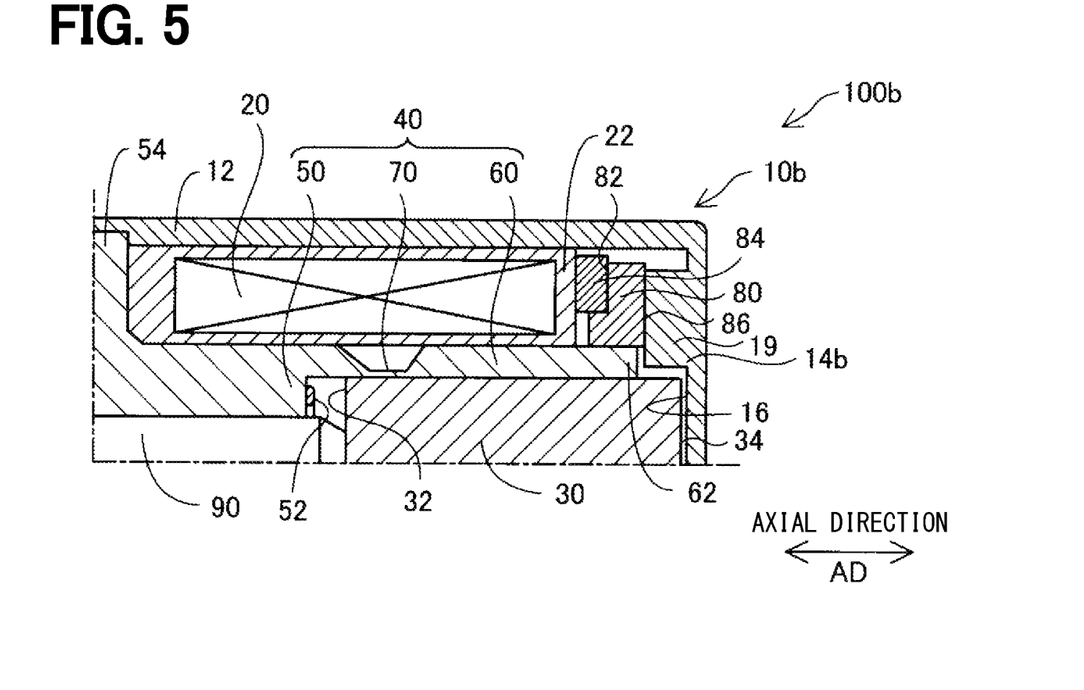
FIG. 5 is a partial cross-sectional view for explaining a configuration of the main part of the solenoid according to a third embodiment.

As shown in FIG. 5, a solenoid 100b of the third embodiment is different from the solenoid 100 of the first embodiment in that the yoke 10b is provided in place of the yoke 10. Since the other configurations are the same as those of the solenoid 100 of the first embodiment, the same configurations are designated by the same reference numerals, and detailed description thereof will be omitted.

The yoke 10b included in the solenoid 100b of the third embodiment is formed with a step portion 19 projecting inward on the radial outer side of the recess 16 formed in the bottom portion 14b. The magnetic flux transfer member 80 is arranged so as to face a step portion 19, and is pressed against an end surface of the step portion 19 by the urging member 84.

According to the solenoid 100b of the third embodiment described above, the same effects as that of the first embodiment are obtained.

D. Other Embodiments (1) In each of the above embodiments, when the plunger 30 is closest to the magnetic attraction core 50, the base end surface 34 of the plunger 30 is located closer to the bottom portions 14, 14a, and 14b side than the end 62 of the sliding core 60. However, the present disclosure is not limited to this configuration. When the plunger 30 is closest to the magnetic attraction core 50, a position of the base end surface 34 of the plunger 30 along the axial direction AD may be substantially the same as a position of the end 62 of the sliding core 60. In other words, when the plunger 30 is closest to the magnetic attraction core 50, the base end surface 34 of the plunger 30 and the end surface of the end 62 facing the bottom portions 14, 14a, and 14b are substantially coincident in the axial AD. Even with such a configuration, the same effect as that of each of the above described embodiments can be obtained.

(2) In each of the above embodiments, the base end surface 34 of the plunger 30 is located closer to the bottom portion 14, 14a, and 14b side than the end surface 86 of the magnetic flux transfer member 80 in a state where the plunger 30 is closest to the magnetic attraction core 50. However, the present disclosure is not limited to this configuration. When the plunger 30 is closest to the magnetic attraction core 50, the base end surface 34 of the plunger 30 may substantially coincide with the end surface 86 of the magnetic flux transfer member 80 in the axial direction AD and may be located closer to the bottom portions 14, 14a, 14b side than the end 62 of the sliding core 60. Further, when the plunger 30 is closest to the magnetic attraction core 50, the end surface 86 of the magnetic flux transfer member 80 may be located closer to the bottom portions 14, 14a, 14b side in the axial direction AD than the base end surface 34 of the plunger 30, and the base end surface 34 of the plunger 30 may be located closer to the bottom portions 14, 14a, 14b side than the end 62 of the sliding core 60. Even with such a configuration, the same effect as that of each of the above described embodiments can be obtained.

(3) The configurations of the solenoids 100, 100a, and 100b of each of the above embodiments are merely examples and can be changed in various ways. For example, the end 62 of the sliding core 60 may be located closer to the bottom portions 14, 14a, and 14b side in the axial direction AD than the end surface 86 of the magnetic flux transfer member 80, and may be substantially coincident in the axial direction AD. Further, for example, the end 62 of the sliding core 60 may be housed in the recess 16. Further, for example, the recess 16 of the bottom portion 14 may be omitted. Further, for example, the plunger 30 is not limited to a substantially columnar shape, and may have an arbitrary columnar external shape. Further, the cylindrical portion 12 of the sliding core 60 and the yoke 10 is not limited to a substantially cylindrical shape, and may be designed to have a cylindrical external shape corresponding to the external shape of the plunger 30. Even with such a configuration, the same effect as that of each of the above described embodiments can be obtained.

(4) The solenoids 100, 100a, 100b of each of the above embodiments are applied to the linear solenoid valve 300 for controlling the hydraulic pressure of the hydraulic oil supplied to the automatic transmission for vehicles, and function as an actuator for driving the spool valve 200. However, the present disclosure is not limited to this configuration. For example, the solenoids may be applied to any solenoid valve such as an electromagnetic oil passage switching valve of a valve timing adjusting device that adjusts the valve timing of an intake valve or an exhaust valve of an engine. Further, for example, instead of the spool valve 200, an arbitrary valve such as a poppet valve may be driven, and instead of the valve, an arbitrary driven body such as a switch may be driven.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A solenoid, comprising:
a coil configured to generate a magnetic force when energized;
a cylindrical sliding core arranged on an inner peripheral surface of the coil;
a columnar plunger arranged on the inner peripheral surface of the sliding core and configured to slide in an axial direction;
a bottomed cylindrical yoke including a cylindrical portion along the axial direction and a bottom portion that is connected to the cylindrical portion, is formed in a direction intersecting the axial direction and faces a base end surface of the plunger, and the bottomed cylindrical yoke configured to accommodate the coil, the sliding core, and the plunger;

a magnetic attraction core arranged in the axial direction to face a distal end surface of the plunger and configured to attract magnetically the plunger by a magnetic force generated by the coil; and a magnetic flux transfer member that is arranged on an outer peripheral side of an end of the sliding core facing the bottom portion and transfers magnetic flux between the sliding core and the yoke, wherein when the plunger is closest to the magnetic attraction core, a position of the base end surface of the plunger along the axial direction is closer to the bottom portion along the axial direction than the end of the sliding core, a recess is formed so as to accommodate the base end surface of the plunger in a state where the plunger is farthest from the magnetic attraction core, the end of the sliding core is not housed in the recess;

the plunger is axially moveable due to a clearance between the distal end surface of the plunger and a stopper; and in a range of axial movement of the plunger, the base end surface of the plunger is always located closer to the bottom portion than the end of the sliding core.

2. The solenoid according to claim 1, wherein
when the plunger is closest to the magnetic attraction core, the position of the base end surface of the plunger along the axial direction is the same as a position of an end surface facing the bottom portion of the magnetic flux transfer member along the axial direction, or is closer to the bottom portion side of the sliding core along the axial direction than the end surface.

3. The solenoid according to claim 2, wherein
on a surface of the bottom portion opposite to the surface on which the recess is formed, a convex portion is formed so as to protrude outward at a position corresponding to the recess.

4. The solenoid according to claim 3, wherein the bottom portion has a substantially constant wall thickness as the yoke.

5. The solenoid according to claim 1, wherein
on a surface of the bottom portion opposite to the surface on which the recess is formed, a convex portion is formed so as to protrude outward at a position corresponding to the recess.

6. The solenoid according to claim 1, wherein
the base end surface of the plunger faces the bottom portion of the yoke and is accommodated in the recess when the coil is not energized.

7. The solenoid according to claim 1, wherein
the base end surface of the plunger projects further toward the bottom portion side from the end of the sliding core by a length in the axial direction.

8. The solenoid according to claim 1, wherein
the end of the sliding core is farther away from the bottom portion in the axial direction than an outer peripheral surface of the magnetic flux transfer member that is closest to the bottom portion.

9. The solenoid according to claim 1, wherein a part of the end of the sliding core is overlapping with the recess in a radial direction, and another part of the end of the sliding core is non-overlapping with the recess in the radial direction, and the radial direction is perpendicular to the axial direction.

* * * * *